(No Model.)

H. W. STONE, Jr.
GEAR WHEEL.

No. 288,134. Patented Nov. 6, 1883.

WITNESSES:
Thos. Houghton.
W. X. Stevens.

INVENTOR:
H. W. Stone Jr.
BY Mann
ATTORNEYS.

UNITED STATES PATENT OFFICE.

HEMAN WARD STONE, JR., OF MORRIS, MINNESOTA.

GEAR-WHEEL.

SPECIFICATION forming part of Letters Patent No. 288,134, dated November 6, 1883.

Application filed March 13, 1883. (No model.)

*To all whom it may concern:*

Be it known that I, HEMAN WARD STONE, Jr., a citizen of the United States, residing at Morris, in the county of Stevens and State of Minnesota, have invented a new and useful Improvement in Noiseless Gear-Wheels, of which the following is a specification.

My invention relates to that class of gear-wheels which engage to revolve each other by means of teeth in their circumferential edges. It is a well-known fact that in iron-rolling mills where large gear-wheels are used the rattling of the gear-teeth produces a roaring noise, which is almost unendurable inside the mills and an actual damage to the value of property for residence in the immediate vicinity thereof.

The object of my invention is to construct gearing which will run and perform its regular service without producing this objectionable noise, or will produce very much less of it.

To this end my invention consists in the construction and combination of parts hereinafter described and claimed, reference being had to the accompanying drawings, in which—

Figure 1:
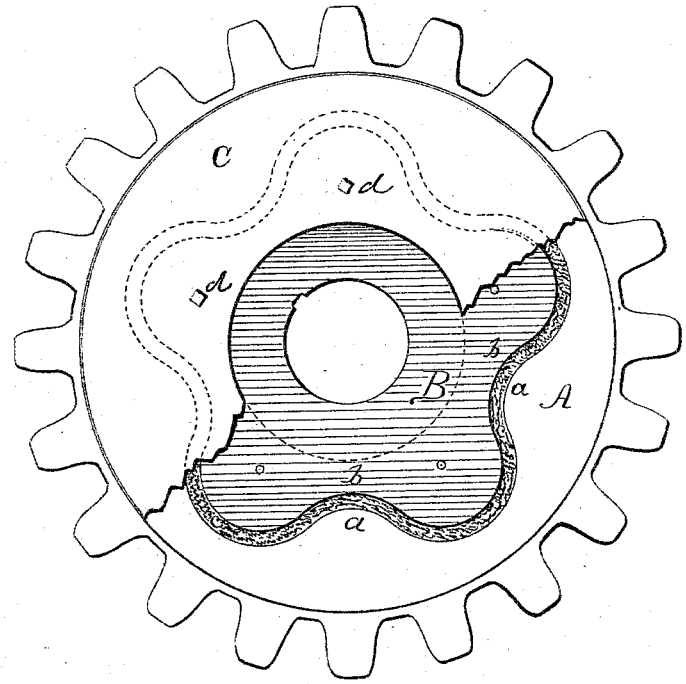
Figure 2:
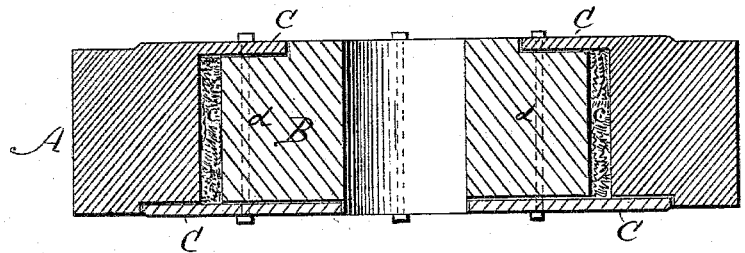

Figure 1 is a side elevation, and Fig. 2 is a transverse section, of a gear-wheel, showing my invention.

A represents an annular wheel provided with gear-teeth on its circumferential edge, and scalloped or curvilinear in its internal boundary, $a\ a$. B is the hub of the wheel, cast as a separate piece therefrom, with its periphery corresponding in its contour $b$ to the internal boundary, $a$, of the wheel, but enough smaller in diameter to leave a considerable space, $c$, between the wheel and its hub. This space $c$ is to be filled with leather scraps, india-rubber, paper, or any elastic or insonorous material, to serve as a cushion to the action of the gear-teeth as they rattle together, and to interrupt the sonorous vibrations of the wheel. The wheel and hub are mechanically secured together as one wheel by means of two collars, C, placed on the two faces of the wheel and held thereto by means of bolts $d$; or, instead of two collars C, one such collar may be used in connection with a flange on the opposite face, cast as a part of the hub and extending across the space $c$; or a flange to produce the same effect may be cast on the wheel to extend inward across said space $c$, the purpose of these collars or flanges being merely to keep the filling in space $c$ and to prevent the rim and hub of the wheel from becoming separated, and yet to allow the rim a slight rotary motion relative to the hub, to be taken up by the cushion thereon.

The periphery of the hub and the contiguous interior of the rim may have any other forms than those shown, provided that the motion of the one is conveyed to the other through an insonorous medium. An insonorous packing may also be placed between the collars or flanges and the faces of the hub and rim. By this means I not only prevent, to a great extent, the noise usual to gearing, but I increase its wearing capacity, and I lessen the liability of breaking the gear-teeth or of twisting shafting by sudden starts or stoppages.

What I claim as my invention is—

The combination, with the internally-scalloped gear-wheel A and the externally-scalloped hub B, of a non-sonorous cushion, $c$, interposed between the two, and collars or flanges C and bolts $d$, uniting the two parts A and B, as shown and described.

HEMAN WARD STONE, JR.

Witnesses:
O. C. ANDERSON,
O. C. HANSON.